Oct. 11, 1966 D. H. RUMBLE 3,278,898

DATA TRANSMISSION SYSTEM FOR DISTINCTIVELY MODULATING GIVEN DATUM BITS FOR PARITY CHECKING

Filed Dec. 31, 1962 2 Sheets-Sheet 1

INVENTOR
DALE H. RUMBLE
BY Robert E. Sandt
AGENT 3,278,898
Patented Oct. 11, 1966

3,278,898

DATA TRANSMISSION SYSTEM FOR DISTINCTIVELY MODULATING GIVEN DATUM BITS FOR PARITY CHECKING

Dale H. Rumble, Carmel, N.Y., assignor to International Business Machines Corporation, New York, N.Y., a corporation of New York Filed Dec. 31, 1962, Ser. No. 248,533
9 Claims. (Cl. 340—146.1)

This invention relates to the data communication apparatus and more particularly to a method and apparatus for varying the parity information in a serially transmitted coded data message.

It is generally axiomatic in data communication that the speed of the data transmission must necessarily be prejudiced by the insertion of parity checking information in the message to insure the integrity of the transmission. It is further true that the noise and interference conditions in the transmission medium vary over a considerable range. It is, therefore, inefficient to transmit at all times a sufficient number of parity checks to insure the integrity of the message under the worst noise condition, particularly when such condition occurs relatively infrequently. The optimum efficiency is achieved when the quantity of parity is adjusted compatibly with the changes in the noise or interference and with the security requirements of the message.

When a change in the quantity of parity transmission has been effected by prior art technologies, it has generally been necessary for some cross-communication to exist between the transmitter and the receiver. Either the receiver must call for a change in the parity, or the transmitter must instruct the receiver that the data to follow will employ a given pattern of parity, so that the receiver may adjust its modes of operation to be compatible with the character of the transmission to follow. Not only is this cross-communication consumptive of time that could otherwise be profitably employed for the transmission of data, but also the apparatus at the receiver and the transmitter becomes quite complex.

In the instant apparatus the transmitter, without any cross-communication with the receiver, adjusts the parity insertion rate, and so combines the parity bits into the data message that the character of the message itself is self-instructing to the receiver. The rate of parity bit insertion may, therefore, be altered at will as the noise level changes. The control may be manually controlled, automatically by noise level detectors, statistically by observation of previous interference patterns at various times of the day and year, or by a return from the receiver indicating the need for greater security. Even though the receiver may initiate the change in security the actual change in the transmitter may be effected at any time without instruction to the receiver.

It is, therefore, an object of this invention to provide a data transmitter for producing a data message including parity checking bits wherein the data bits are uniquely modulated to include the parity information.

A further object of this invention is to provide an apparatus associated with the transmitter in a data transmission system for counting the incidence of pulses of a given data significance and uniquely modulating every pulse producing a predetermined count so as to transmit parity checking information.

Another object of this invention is to provide apparatus in accordance with the foregoing objects wherein the incidence of parity checking information may be changed at the transmitter in such fashion that the receiver will automatically adjust to the change in parity.

A final and specific object of this invention is to provide an apparatus associated with the transmitter in a bi-polar data transmission system for separately counting the incidence of binary zero and binary one data bits and for extending the pulse duration of predetermined ones of the bits under control of the respective counts thereof.

The foregoing and other objects, features and advantages of the invention will be apparent from the following more particular description of a preferred embodiment of the invention, as illustrated in the accompanying drawings.

Figure 1:
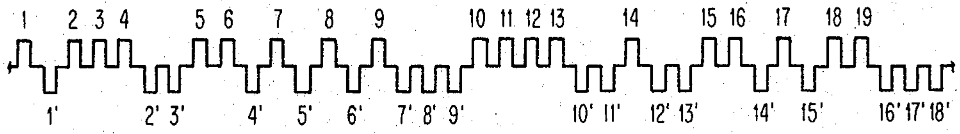
FIG. 1 is a typical bi-polar pulse train.

Although the principles of the invention may be employed in other modes of asynchronous serial coded data transmission, it is easiest to illustrate and describe those principles in a bi-polar serial transmission mode. Therefore, the train of pulses in FIG. 1 are shown in the bipolar mode and constitute a typical message pulse train in which no parity check is present. For clarity of visual presentation the mark and space intervals have been shown equal.

Figure 1A:
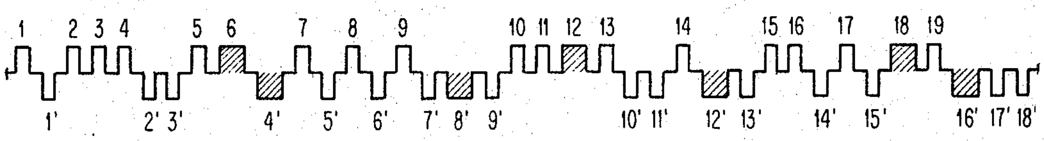
FIG. 1A is the pulse train of FIG. 1 with parity information added.

The pulse train waveform in FIG. 1A includes the parity information which is transmitted periodically by elongating the datum pulse. This elongation may occur at different preset intervals for the "0" data bit signals and the "1" data bit signals. The parity may occur on even bits for both zeros and ones, on odd bits for both zeros and ones, or even bits for zeros and odd bits for ones or vice-versa. Once the rule has been arbitrarily chosen, it must be rigorously obeyed, as the apparatus is conditioned for operation for only one type of operation. Common to all of these operations is the necessity that an odd number of bits intervene between the bits which are modulated to include parity. Stated another way, all modulated bits as to any one polarity of signal, must all be even bits or odd bits but not both.

In the pulse train of FIG. 1A, it has been arbitrarily chosen that only the even-numbered bits on both the zero and one bits shall be modulated to contain the parity check information. It has been further arbitrarily chosen that every sixth "0" datum bit and every fourth "1" datum bit shall contain parity. Therefore, as to the zero data bits the sixth, twelfth, eighteenth, etc., bits will be stretched. As to the one data bits, the fourth, the eighth, twelfth, etc., bits will be stretched. The effect of the compliance with these arbitrary rules is shown in FIG. 1A wherein the parity information bearing pulses are cross-hatched for emphasis. If one wishes, he may consider the first portion of the stretched pulse as datum information and the prolongation thereof as the parity.

As the explanation of the apparatus for effecting the parity may occur at any interval and may be adjusted while the message is being transmitted without adverse effect. The interval may vary from no parity, through every fourth and sixth bit as shown, to every one hundredth or more bits, depending solely on the requirements for message integrity relative to the interference and noise conditions in the transmission medium.

Figure 2:
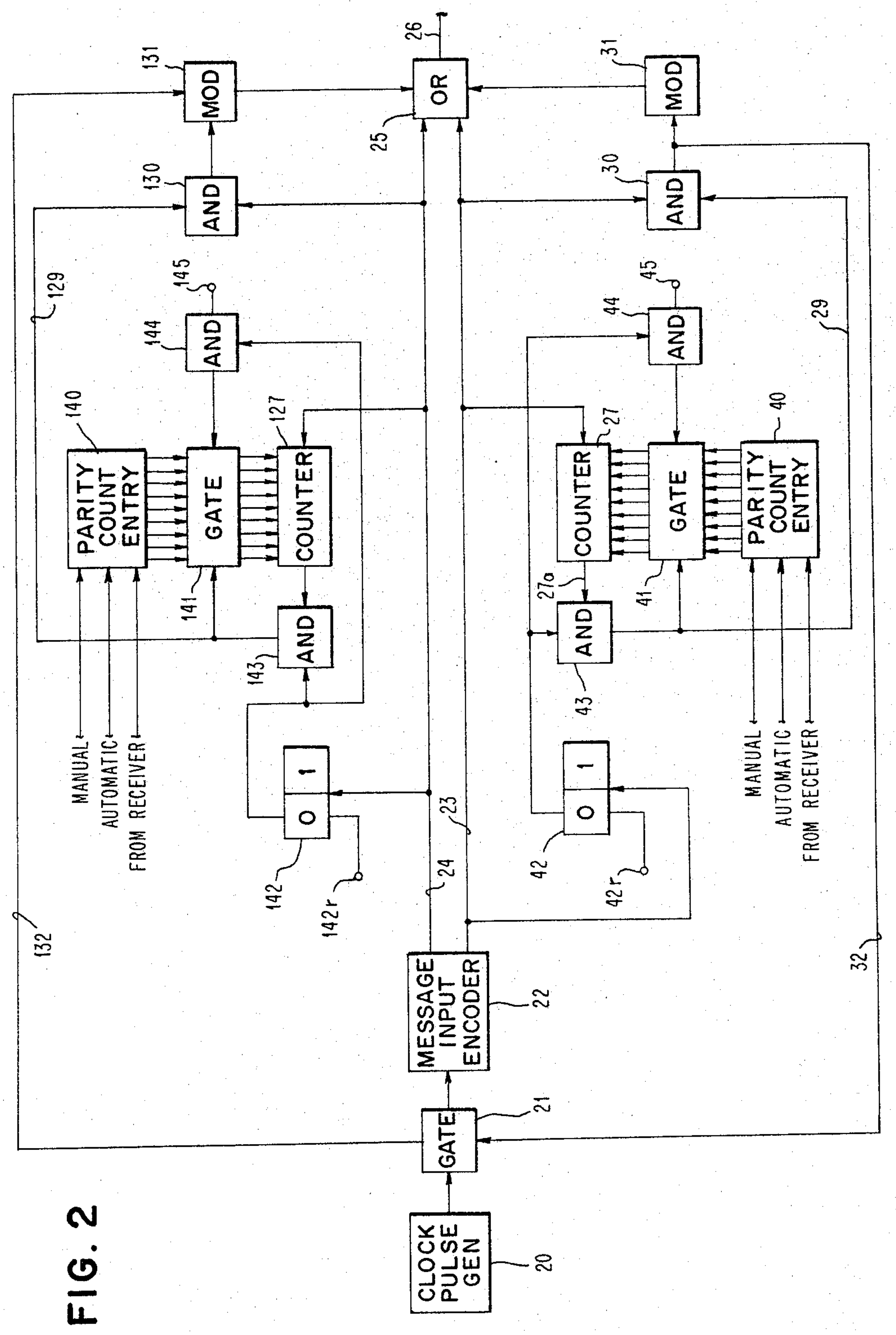
FIG. 2 is a schematic showing of the apparatus for effecting the parity information modulation of the pulse train of FIG. 1 to achieve the pulse configuration of FIG. 1A.

A simple form of apparatus for effecting the pulse modulation for parity checking purposes is shown in FIG. 2. Here, the clock pulse generator 20, operating through the normally closed gate 21, controls the message input circuits 22 to produce the requisite serializing of the input data with the "0" data bit pulses appearing as negative pulses on the line 23 and the "1" bit data pulses appearing as positive pulses on the line 24. These positive and negative pulses, whether or not parity is employed, are recombined in the bi-polar OR circuit 25 to produce the train of positive and negative pulses manifestive of the message on the transmission line 26.

For the purposes of inserting parity two counters 27 and 127 are provided. The counter 27 counts the incidence of all the "0" data pulses, and when it achieves a present count, it controls the production of a control potential on the line 29 to conjointly with the pulse potential on the line 23 operate the AND gate 30 to control the modulator 31 to stretch the pulse then in transit through the OR gate 25. Since the stretched pulse must necessarily encroach upon the next succeeding space interval, the feedback loop 32 provides an inhibit action to the gate 21 to prevent one clock pulse from being passed. The remainder of the message is thus precessed by one space distance for each parity insertion. The modulator 31, for example, may be a simple single shot multivibrator, which is fired upon the incidence of the pulse to be stretched, and has a pulse duration equal to twice the normal pulse length. The OR gate 25, will, therefore, yield a double length pulse to the output line 26 whenever the counter 27 achieves its preset count.

The operation of the counter 127 is similar to that of the counter 27. Pulses on the line 24 are counted in the counter 127, which when it attains a count to which it is preset controls the reproduction of an output response on the line 129, which together with the positive datum pulse on the line 24 activates AND 144 to energize the modulator 130 to extend the datum pulse in the manner above described. The feedback loop 132 provides the control to inhibit one clock pulse to provide the time necessary for the pulse elongation.

Both of the counters 27 and 127 are presettable to any number within their capacity, and will produce an output response when a count equal to the present number, or any integral multiple thereof, is attained. Since parity is to be inserted only on all even numbered bits (or on all odd-numbered bits), but not mixed, the numbers which are preset in the counters will obviously all be even numbers. A simple counter for this purpose is a binary counter which is stepped in reverse order for each received pulse, and which re-enters the preset number in parallel into the counter triggers upon the incidence of the pulse next following that pulse which reduced the count in the counter to one.

The apparatus requisite for effecting the control of parity in the zero line includes the parity count entry device 40 which consists of switches into which any even number from zero to the capacity of the counter 27 may be preset. These switches provide binary coded potentials to establish the triggers in the counter 27 to their respective conductivity statuses to manifest the desired number of counts before parity insertion is to occur. This number is entered into the counter 27 whenever the gate 41 is opened to permit the passage of the set and reset potentials to the respective triggers. To insure that the preset number is only preset into the counter 27 upon the incidence of an even datum bit on the line 23, the binary trigger 42 is provided. This trigger is initially reset to the zero state by pulsing the reset hub 42*r* before the zero state by pulsing the reset hub 42*r* before the message begins. Each pulse complements the state of the trigger 42. Thus, the output from the trigger 42 together with output from the first counter stage activates the AND gate 43 to open the gate 41 to enter the preset number upon each count down to one.

Assuming that, as in the example given, every fourth zero bit shall contain parity. The trigger 42 is initially reset to zero. The output from the zero line 23 provides an output to an AND gate 44. With the switches in the parity count entry device set to four, and the hub 45 pulsed to initially enter the count, the number four will be entered into the counter 27. The message may now begin. The first pulse switches trigger 42 to the one state, and counter 27 to register a 3. The second pulse switches trigger 42 to zero, and counter 27 to register 2. The third pulse switches to trigger 42 to one, and the counter 27 to register one and thus produce a potential in the line 27*a*. The fourth pulse switches trigger 42 to zero, but cannot further switch the counter 27. However, when the trigger switches to zero the AND gate 43 will generate a pulse to open gate 41 to re-enter four into the counter 27, and to operate the modulator 31 to stretch the fourth pulse through AND gate 30. This action will repeat every fourth count. If the parity count requires changing the switches in the count entry device need only be changed to manifest the new number. When the countdown from the previous number reaches one and the next pulse arrives, the new number will be entered, when the gate 41 is opened. Thus, when the counter 27 is initially phased to manifest an even count when the line 23 manifests an even pulse count, it will never require rephasing until the receiver gets out of phase with the transmitter and the whole system is reset.

In the circuits for controlling the parity insertion on the one side of the line, the referenced characters have a one prefixed thereto, but otherwise the units and tens ordered digits denote similar elements. A parallelism may, therefore, be drawn between the operation of the counter 27 circuits and the counter 127 circuits. The only difference in their operation is that the counter 27 is preset with a four count while the counter 127 is preset with a six count.

Should it be desired that either of the counters 27 or 127 operate on odd-numbered bits, then the connections to the triggers 42 and 142 will be reversed and the initial entry and all subsequent re-entries of the preset numbers will occur on odd-numbered pulses, rather than the even numbered pulses shown.

Figure 3:
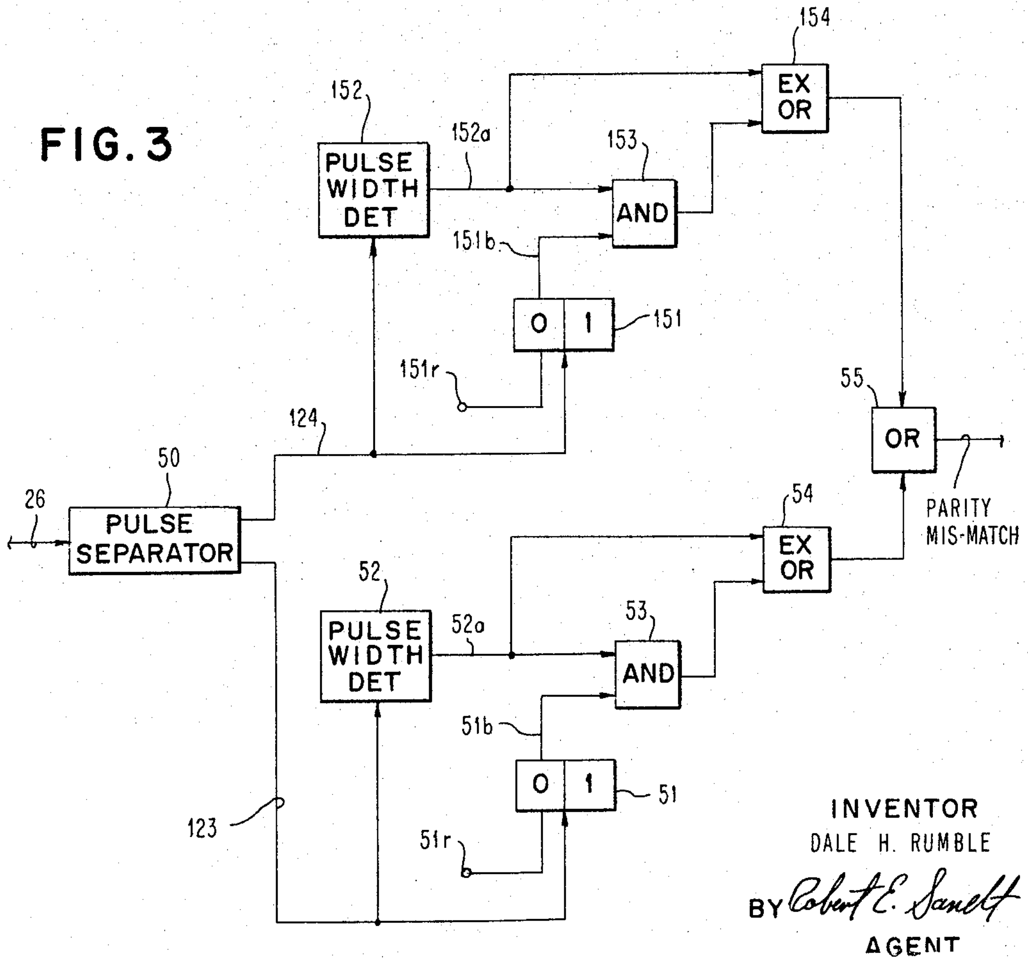
FIG. 3 is a schematic showing of a receiver operative to render a parity non-check signal in response to the improper reception of a pulse train like that of FIG. 1A.

In the receiver (shown in FIG. 3) the bi-polar pulse train is received on the transmission line 26 and separated into its negative and positive component "0" and "1" pulses by the pulse separator 50. The negative pulses appear on the line 123, and the positive pulses on the line 124. Except for operating responsive to opposite polarity pulses, the "0" and "1" parity detection circuits are identical and similar reference characters will be applied to corresponding elements, a one being prefixed to the elements processing "1" bit information. The explanation for the "0" bit processing elements will, therefore, be equally applicable to the "1" bit processing elements.

The binary trigger 51 will be initially reset to zero before the message transmission begins by pulsing reset hub 51*r*. Each pulse on the line 123 will, thereafter, complement the conductivity status of the trigger 51. Since the trigger is initially reset to the zero state, it is this state which measures the "evenness" of the pulse sequence. If a stretched pulse (denoting parity) appears on the line 123, the pulse width detector 52 will produce an output on the line 52*a*. If this pulse is also an even pulse the line 51*b* from trigger 51 will also be potentialized to energize the AND gate 53, the output from which indicates a parity check. However, since the lack of parity check is of interest, the exclusive OR gate 54 is provided. This gate 54 has inputs from AND gate 53 and the pulse width detector 52. If a long pulse occurs on the line 123 and the count is odd in trigger 51, the AND gate 53 will not produce an output, but the pulse width detector will produce an output. This status will energize exclusive OR 54 to indicate a lack of parity check. So long as the exclusive OR gate 54 receives both inputs or no inputs it will produce no output. The lack of parity check from gate 54 is combined in OR gate 55 with any mis-matches from the one exclusive OR gate 154.

From the foregoing description of the receiver, it will be appreciated that an elongated message pulse on either the "0" or "1" pulse line 123 or 124 must occur on an even-numbered pulse or a lack of parity will be signalled. Since the only prerequiste is that the pulse be even, the number of pulses intervening between the stretched pulses is of no moment to the receiver, so long as the even relationship is maintained. The transmitter, therefore, may arbitrarily insert any even count into the bit counters 27 and 127 and the receiver will respond appropriately without any instruction as to the change. Since it is only the distinctive modulation of the data pulses themselves which convey the parity information, the receiver need only check to see if this distinctive modulation has been applied and if the pulse or pulses to which it has been applied are even-numbered in the sequence of pulses since the last reset operation.

Although the variable parity insertion has been illustrated in a serial bi-polar asynchronous mode of data transmission, it is quite apparent that the principles described may equally well be applied to other modulating schemes such as pulse width modulation, phase width modulation or, pulse position production. Whatever modulation scheme is employed the parity is inserted by an additional distinctive modulation of the data bit to include parity. The receiver references the signal thus received to the beginning of the message and thus detects the absence of the parity if an error has occurred.

Parity may, therefore, be inserted as frequently as required and thus not penalize the overall bit rate unnecessarily. This fact plus the simplicity and reliability of the apparatus both at the transmitter and the receiver, contribute to provide a low cost data transmission system for applications where error detection only is required.

While the invention has been particularly shown and described with reference to a preferred embodiment thereof, it will be understood by those skilled in the art that various changes in form and details may be made therein without departing from the spirit and scope of the invention.

What is claimed is:

1. In a data transmission system wherein a message is transmitted over the transmission medium by a succession of electrical signals distinctly, manifestive of the binary zero and binary one data bits, an apparatus associated with the transmitter in said system for generating variable parity checking information, comprising, (a) settable means for manifesting a predetermined numerical value N, where N has an even integral value;

(b) means operative jointly responsive to said settable means and to each of said binary one datum signals for producing an output response upon the occurrence of every N'th binary one datum signal, (c) and means responsive to said output response for uniquely modulating each of said N'th binary one datum signals to manifest parity checking information.

2. In a data transmission system wherein a message is transmitted over the transmission medium by a succession of electrical signals distinctly, manifestive of the binary zero and binary one data bits, an apparatus associated with the transmitter in said system for generating variable parity checking information, comprising, (a) settable means for manifesting a predetermined numerical value N, where N has an even integral value;

(b) means operative jointly responsive to said settable means and to each of said binary zero datum signals for producing an output response upon the occurrence of every N'th binary zero datum signal, (c) and means responsive to said output response for uniquely modulating each of said N'th binary zero datum signals to manifest parity checking information.

3. In a data transmission system wherein a message is transmitted over the transmission medium by a succession of electrical signals distinctly, manifestive of the binary zero and binary one data bits an apparatus associated with the transmitter in said system for generating variable parity checking information, comprising, (a) first settable means for manifesting a first predetermined numerical value N, where N has an even integral value;

(b) second settable means for manifesting a second predetermined numerical value, M, where M has an even integral value;

(c) means operative jointly responsive to said first settable means and to each of said binary one datum signals for producing a first output response upon the occurrence of every N'th binary one datum signal;

(d) means operative jointly responsive to said second suitable means as to each of said binary zero datum signals for producing a second output response upon the occurrence of every M'th binary zero datum signal;

(e) means responsive to said first output response for uniquely modulating each of said N'th binary one datum signals to manifest parity checking information, (f) and means responsive to said second output response for uniquely modulating each of said M'th binary zero datum signals to manifest parity checking information.

4. In a data transmission system having a data transmitter and a data receiver operatively associated through a transmission medium, wherein a message is transmitted by a succession of electrical signals distinctly manifestive of the binary zero or binary one data bits the combination of, (a) settable means at said transmitter for manifesting a predetermined numerical value N, where N has an even integral value;

(b) means operative responsive to said settable means and to each of said binary one datum signals for producing an output response upon the occurrence of every N'th binary one datum signal;

(c) modulating means responsive to said output response for uniquely modulating each of said N'th binary one datum signals to manifest parity checking information;

(d) means at said receiver operative responsive to said binary one datum signals to produce a first signal upon the receipt of every even-numbered binary one datum signals;

(e) means at said receiver operative responsive to each uniquely modulated signal produced by said modulating signal to yield a second signal;

(f) means at said receiver responsive to the presence of said second signal and the absence of said first signal for manifesting a failure to check parity.

5. In a data transmission system having a data transmitter and a data receiver operatively associated through a transmission medium, wherein a message is transmitted by a succession of electrical signals distinctly manifestive of the binary zero or binary one data bits the combination of, (a) settable means at said transmitter for manifesting a predetermined numerical value N, where N has an even integral value;

(b) means operative responsive to said settable means and to each of said binary zero datum signals for producing an output response upon the occurrence of every N'th binary zero datum signal;

(c) modulating means responsive to said output response for uniquely modulating each of said N'th binary zero datum signals to manifest parity checking information;

(d) means at said receiver operative responsive to said binary zero datum signals to produce a first signal upon the receipt of every even-numbered binary zero datum signals.

6. In a data transmission system wherein the zero and one datum bit signals are serially transmitted respectively as negative and positive pulses of predetermined length separated by spaces, apparatus associated with the transmitter in said system for generating variable parity checking information comprising, (a) settable means for manifesting a predetermined numerical value N, where N has an even integral numerical value;

(b) means operative jointly responsive to said settable means and to said negative zero datum bit signals for producing an output response upon the occurrence of every N'th negative zero datum bit signal;

(c) and means responsive to said output response for extending the duration of each said N'th negative zero datum pulse by a fixed amount to convey parity checking information.

7. In a data transmission system wherein the zero and one datum bit signals are serially transmitted respectively as negative and positive pulses of predetermined length separated by spaces, apparatus associated with the transmitter in said system for generating variable parity checking information comprising, (a) settable means for manifesting a predetermined numerical value N, where N has an integral numerical value;

(b) means operative jointly responsive to said settable means and to said positive one datum bit signals for producing an output response upon the occurrence of every N'th positive one datum bit signal;

(c) and means responsive to said output response for extending the duration of each said N positive one datum pulse by a fixed amount to convey parity checking information.

8. In a data transmission system wherein binary zero and one data signals are serially transmitted respectively by negative and positive electrical signals of fixed length separated by spaces, apparatus associated with the transmitter for generating parity checking information comprising, (a) presettable means for manifesting a predetermined even integral number N;

(b) a units counter;

(c) means responsive to said negative pulses for cycling said counter one unit count for each said pulse;

(d) means responsive to said presettable means for controlling said counter to emit an output response for every N'th count, (e) and means responsive to the output response of said counter upon every N'th count to extend the duration of the negative zero datum bit pulse producing the N'th count to contain parity checking information.

9. In a data transmission system having a transmitter and a receiver connected over a communication link, wherein data is serially transmitted by negative and positive pulses manifestive respectively of the zero and one datum bits of fixed length separated by spaces, the combination of, (a) presettable means at said transmitter for manifesting a predetermined even integral number;

(b) a units counter;

(c) means responsive to said negative pulses for cycling said counter one unit count for each said pulse;

(d) means responsive to said presettable means for controlling said counter to emit an output response for every N'th count;

(e) means responsive to the output response of said counter upon every N'th count to extend the duration of that negative zero datum bit pulse producing the N'th count to contain parity checking information;

(f) means at said receiver operative responsive to said negative zero datum bit signals for producing an even signal upon the occurrence of every other zero datum bit signal;

(g) means at said receiver operative responsive to the extended pulse to produce a check for parity signal;

(h) and means responsive to said check for parity signal and the absence of said even signal for registering the lack of parity check.

References Cited by the Examiner

UNITED STATES PATENTS

| | | | |
|---|---|---|---|
| 2,689,950 | 9/1954 | Bayliss et al. ______ | 340—146.1 |
| 2,972,127 | 2/1961 | Lukoff et al. ______ | 340—146.1 |
| 3,147,460 | 9/1964 | Scott _____________ | 340—146.1 |

MALCOLM A. MORRISON, *Primary Examiner.*

ROBERT C. BAILEY, *Examiner.*

M. P. ALLEN, *Assistant Examiner.*